(12) United States Patent
Holmberg et al.

(10) Patent No.: US 10,627,182 B2
(45) Date of Patent: Apr. 21, 2020

(54) SHOOTING STICKS DEVICE

(71) Applicant: Outdoor Gear Solutions Inc., Falconer, NY (US)

(72) Inventors: Steven C. Holmberg, Kennedy, NY (US); Randal P. Stuart, Jamestown, NY (US); Stephen W. Cass, Frewsburg, NY (US)

(73) Assignee: OUTDOOR GEAR SOLUTIONS INC., Falconer, NY (US)

( * ) Notice: Subject to any disclaimer, the term of this patent is extended or adjusted under 35 U.S.C. 154(b) by 0 days.

(21) Appl. No.: 16/540,392

(22) Filed: Aug. 14, 2019

(65) Prior Publication Data

US 2020/0056856 A1 Feb. 20, 2020

Related U.S. Application Data

(60) Provisional application No. 62/718,557, filed on Aug. 14, 2018.

(51) Int. Cl.
*F41A 23/10* (2006.01)
*F16M 11/24* (2006.01)

(52) U.S. Cl.
CPC ........... *F41A 23/10* (2013.01); *F16M 11/245* (2013.01)

(58) Field of Classification Search
CPC .......... F41A 23/16; F41A 23/10; F41A 23/12; F41A 23/08

USPC ............................................................. 42/94
See application file for complete search history.

(56) References Cited

U.S. PATENT DOCUMENTS

| | | | | |
|---|---|---|---|---|
| 5,317,826 A | * | 6/1994 | Underwood | F41A 23/06 403/223 |
| 5,406,732 A | * | 4/1995 | Peterson | F41A 23/08 248/164 |
| 5,507,111 A | * | 4/1996 | Stinson | F41A 23/08 42/94 |
| 5,930,932 A | * | 8/1999 | Peterson | F41A 23/16 42/94 |
| 7,946,070 B1 | * | 5/2011 | Elhart | F41A 23/16 248/171 |
| 9,557,131 B1 | * | 1/2017 | Antell | F41A 23/10 |

* cited by examiner

*Primary Examiner* — Reginald S Tillman, Jr.

(57) ABSTRACT

Shooting sticks having pivotally attached support rests slidably attached to collapsible legs, said support rests providing a stable platform on which a user may aim and/or shoot a firearm or other object requiring at least temporary immobilization. A first channel running along the length of each support rests allows for the passage of a leg. A brake is attached to each support rest, said brake having an aperture through which a leg passes through, the aperture being configured, when the brake has not been depressed, to arrest any sliding movement of the support rest along the length of the leg to which it is attached. When the brake is depressed, the aperture becomes oriented perpendicular to leg which passes through it, allowing the support rests to freely slide up and down the leg. An elastic member provides an upwardly directed force to aid in support rest stabilization and lift assist.

14 Claims, 10 Drawing Sheets

SHOOTING STICKS DEVICE

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Technical Field

The present invention relates generally to firearm aiming and shooting platforms and more specifically, to a shooting sticks device having collapsible legs pivotally attached to one another and having support rests configured to slide up and down said legs, elastic members being attached to said support rests to provide for enhanced firearm stability and to facilitate ease of use.

Description of Related Art

The ability to successfully aim and shoot a firearm depends greatly upon the ability of the shooter to eliminate or at least substantially reduce any unwanted movement, and to otherwise stabilize the firearm during such critical moments. As the distance between a shooter and a target increases, any subtle movements of the firearm when aiming and shooting will lead to more pronounced negative effects on shot accuracy. All manner of various objects have been used since time immemorial to provide hunters and marksmen with a rest upon which a firearm or other weapon may be stabilized during the critical moments of aiming and shooting. For example, objects such as fences, trees, vehicles, horses, and even the non-shooting arm of the shooter, have been used in attempts to stabilize a firearm. However, the use of such primitive types of firearm rests each have their own respective drawbacks relating to, among other things, the inconvenience of usage, lack of portability by the shooter, and the inability of the rests to satisfactorily stabilize firearm movement.

Shooting sticks having one leg or multiple legs, and including rests mounted on such sticks, are known in the art. However, such prior art shooting sticks have numerous drawbacks that make their use inconvenient at best, and entirely unhelpful at worst. For example, while such prior art shooting sticks may provide a rest upon which to lay a firearm during aiming and shooting, the position of the rest with respect to the legs is not easily adjustable by the user, making it necessary for the user to aim and take shots at various awkward positions. A shooter when hunting may be stalking prey and may desire to stop to utilize shooting sticks to stabilize a firearm. If a shot is not taken, the shooter may want to quickly and quietly configure the shooting sticks in a manner that will make it easier to move the shooting sticks to the next location. This process may repeat itself multiple times over the course of a hunt. In connection with such needs, another drawback of prior art shooting sticks is that it may be quite difficult to position an attached firearm rest from a traveling mode to an aiming/shooting mode each time the user desired to aim/shoot his or her firearm.

Accordingly, what is needed are a shooting sticks device having easily adjustable and deployable rests upon which to rest and stabilize a firearm. What is also needed are shooting sticks having rests attached to collapsible legs of shooting sticks in a manner that they may be easily positioned in relation to such legs, allowing the rests to be positioned to allow for easy articulation of a firearm at various angles and at various positions of travel along the legs of the shooting sticks. What is also needed is a convenient and non-complicated means for the shooting rest surfaces attached to the shooting sticks to be used in one position for aiming and/or shooting, and then quickly and easily returned back to an initial position that is optimized for walking or storage. What is also needed are shooting sticks having elastic components that enhance the stability of the shooting rests on which a firearm is placed for aiming and shooting. The shooting sticks described herein satisfy these needs and others as will become apparent to one of ordinary skill in the art after a careful study of the detailed description of the embodiments set forth below.

BRIEF DESCRIPTION OF THE DRAWINGS

The inventions, as well as preferred and alternate modes of use, further objectives and advantages thereof, will be best understood by reference to the following detailed description of illustrative embodiments when read in conjunction with the accompanying drawings, wherein.

All figures are drawn for ease of explanation of the basic teachings of the invention only; the extensions of the figures with respect to number, position, relationship, and dimensions of the parts to form the preferred embodiment will either be explained or will be within the skill of persons of ordinary skill in the art after the following teachings of the present invention have been read and understood.

DETAILED DESCRIPTION

Several embodiments of the shooting sticks device will now be described with reference to the drawings. The embodiment of the shooting sticks device illustratively disclosed herein suitably may be practiced in the absence of any element which is not specifically disclosed herein.

Multiple embodiments of pivotally attached shooting sticks devices are disclosed herein. Embodiments of the shooting sticks device described herein are intended to be portable and constructed of relatively light weight materials such that a single user may easily transport the device in the field in compact form and be deployed for use without assistance. The embodiments of the shooting sticks devices described herein have the following two general modes: 1.) a deployed mode in which the shooting sticks are extended and ready for supporting a firearm or other object such as a spotting scope or camera; and 2.) a non-deployed "takedown" mode in which the shooting sticks are folded into a compact or collapsed configuration to reduce overall size for transport and/or storage. As discussed below, some embodiments of the shooting sticks device are not capable of being "taken down," collapsed, or otherwise able to be folded for travel or storage. The legs of the embodiments of the shooting sticks described herein are not intended to be secured to any particular surface, but are rather intended to rest on the ground or other shooting surface. However, it should be noted that it is contemplated that alternate embodiments of the shooting sticks device, with relatively minor modifications, could be adapted for mounting (either permanently or removably) the legs to a surface of a, for example, motor vehicle, marine vessel, aircraft, or structure such as a building or guard tower.

Further, while the shooting sticks devices have been described herein in connection with providing a portable support for the aiming and shooting of firearms, it is contemplated that the device could also be used to provide support for any device that is capable of resting on the support rests. For example, spotting scopes, thermal/night vision optics, rangefinders, cameras, telescopes, video equipment, survey instruments, and other portable devices could be used in conjunction with the shooting sticks device described herein.

Figure 1:
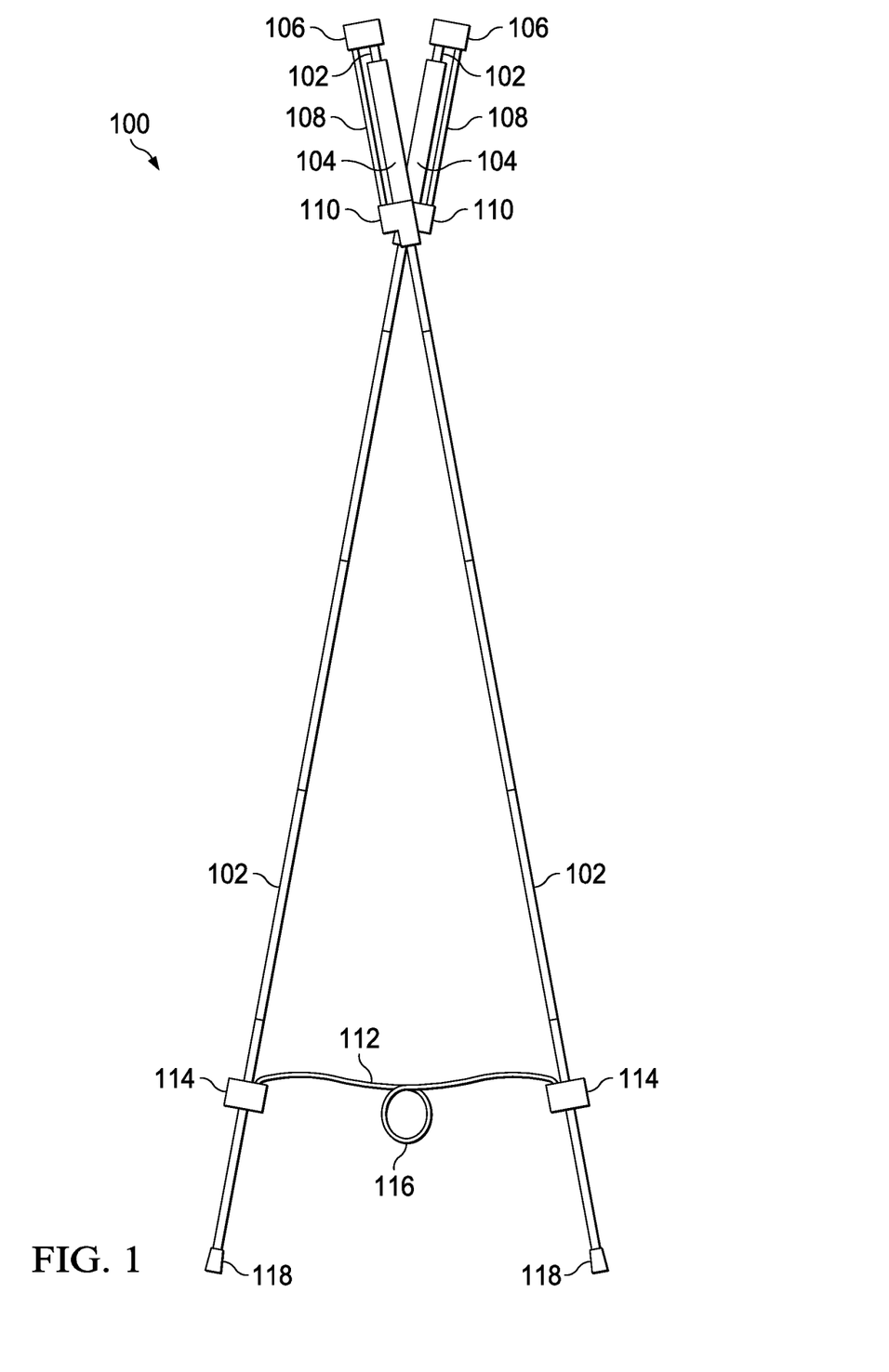
FIG. 1 illustrates a front view of one embodiment of the shooting sticks device.

Referring to FIG. 1, a front view of one embodiment of the shooting sticks device (100) is illustrated. One embodiment of the shooting sticks device (100) as shown in FIG. 1 comprises two legs (102) connected to one another at a pivot point (not shown). In one embodiment, the pivot point comprises a pin connecting lower portions of two elongate support rests (104), each of said support rests having an outer surface for resting a firearm, and an inside surface having at least one enclosed channel running along the length of each support rest sized to allow the passage of a leg (102) of the shooting sticks. In other embodiments of the shooting sticks device as depicted in FIGS. 5, 6, 7, 8, 9, and 10, a second enclosed channel is formed within the support rests to provide for the passage of an elastic member (for example, an elastic cord), which serve to provide an upwardly directed force on the support rest to which it is attached. This upwardly directed force imparted by the elastic member provides for enhanced support rest stabilization when in use, and also efficiently returns the support rests to an uppermost position of travel along the legs, which makes it easier to place the shooting sticks device in optimal configuration for travel and storage (or as discussed above, when a shooter is moving from one location to another location). Another benefit of utilizing elastic members in conjunction with the shooting sticks device as described herein is that the upwardly directed force imparted by the elastic members assists the user in moving the firearm upwards during aiming and/or shooting. This benefit is especially helpful for persons with physical limitations that would otherwise be unable or find it very difficult to move a firearm resting on shooting sticks known in the prior art.

Figure 2:
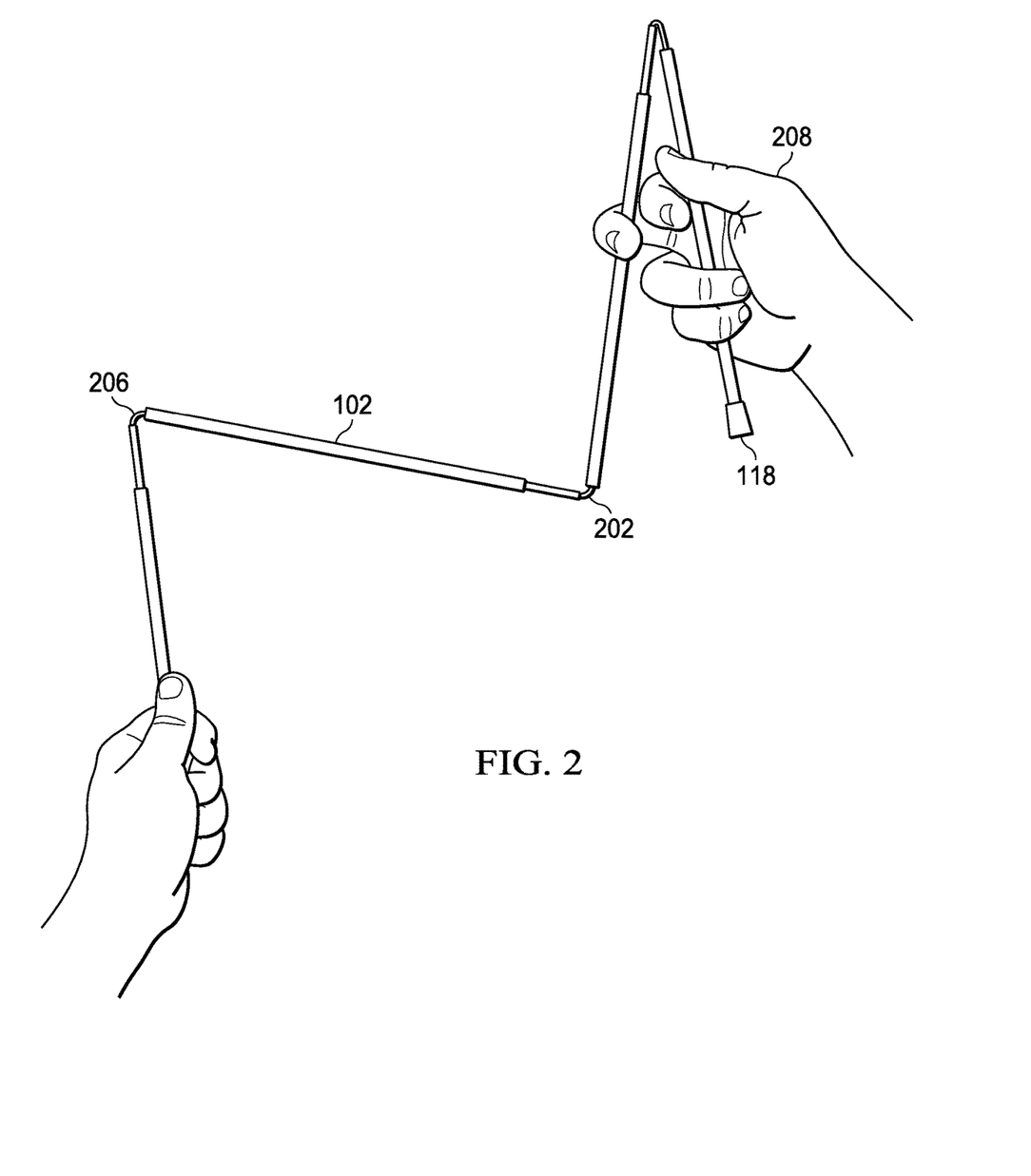
FIG. 2 illustrates a perspective view of one embodiment of a leg of the shooting sticks device comprising a plurality of interlocking leg segments joined by an elastic cord.

In one embodiment, the support rests are constructed of aluminum, but in other alternate embodiments the support rests may made be constructed of various polymers and metals. In one embodiment, a shooting sticks device comprises a plurality of legs (102), each of said plurality of legs being formed by the connection of a plurality of leg segments (as depicted in FIG. 2). The shooting sticks device in one embodiment also comprises a plurality of elongate support rests (104) which are pivotally attached to one another via a pin, a shaft of each of one of said plurality of legs (102) passes through a first enclosed channel formed inside of one of each of said plurality of elongate support rests (as depicted in FIGS. 6, 7, 8, and 10), said elongate support rests being capable of sliding along the respective leg which passes through said first enclosed channel. The shooting sticks device includes a plurality of upper cap assemblies (106), one of each plurality of upper cap assemblies being attached adjacent to a top end of one of each of said plurality of legs. The shooting sticks device includes a plurality of elongate elastic members (108), each elongate elastic member having a first end attached to one of said upper cap assemblies and a second end attached to one of said elongate support rests, or to a lower cap assembly (110) which is in turn attached to a lower end of said support rests.

The support rests (104) are formed around the legs, with upper ends of the legs being secured to an upper cap assembly (106), the lower ends of the legs having rubber feet (118) attached thereto, said rubber feet providing additional traction (preventing slippage) when the shooting sticks rest on the ground or other shooting surface. In the embodiment shown in FIG. 1, an enclosed channel is formed through the length of each support rest, allowing a leg to pass through the enclosed channel, and also allowing the support rest to slide up and down at least a portion of the length of each leg. A lower cap assembly (110) is attached to the bottom end of each support rest (104). The lower cap assembly includes an opening to the aforementioned channel, said opening is sized to allow the passage of a leg, the opening and channel allowing the lower cap assembly and connected support rest to slide freely along each leg.

In one embodiment, an elastic member (108) is secured to the upper cap assembly (106) and the lower cap assembly (110). In alternate embodiments of the shooting sticks device, it is contemplated that an upper or top end of the elastic member may be directly attached to the top end or an upper portion of a leg, and directly attached to the support rest or even a lower portion of the leg. The elastic member, which comprises an elongate elastic cord in this embodiment, may be constructed of any number of materials having elastic properties such as, for example, synthetic rubber latex and other polymers. While the elastic member of the embodiment shown in FIG. 1 is a rubber latex cord, other alternate embodiments might employ various other types of elongate elastic members to provide a naturally upwardly directed biasing or spring force that provides for enhanced stability of the firearm rest when in use, and to supply an upwardly directed force to return the support rests to the uppermost position of travel at or near the top end of the sticks. Those of ordinary skill in the art will recognize that the size and type of elongate elastic members may be chosen to provide for greater or less resistance (greater or less elasticity or spring constant). For example, an embodiment of the shooting sticks device designed for use with a firearm/optic weight of twelve pounds may utilize elastic members having properties providing for greater resistive force than an embodiment of the shooting sticks device having elastic members designed for use with a firearm/optic having a weight of six pounds. As previously noted, the utilization of elastic members in conjunction with the shooting sticks device as described herein provides benefits not found in other shooting sticks devices known in the prior art. Specifically, the upwardly directed force imparted by the elastic members assists the user in moving the firearm upwards during aiming and/or shooting, which is especially helpful for persons with physical limitations that would otherwise be unable or find it very difficult to move a firearm.

Figure 3:
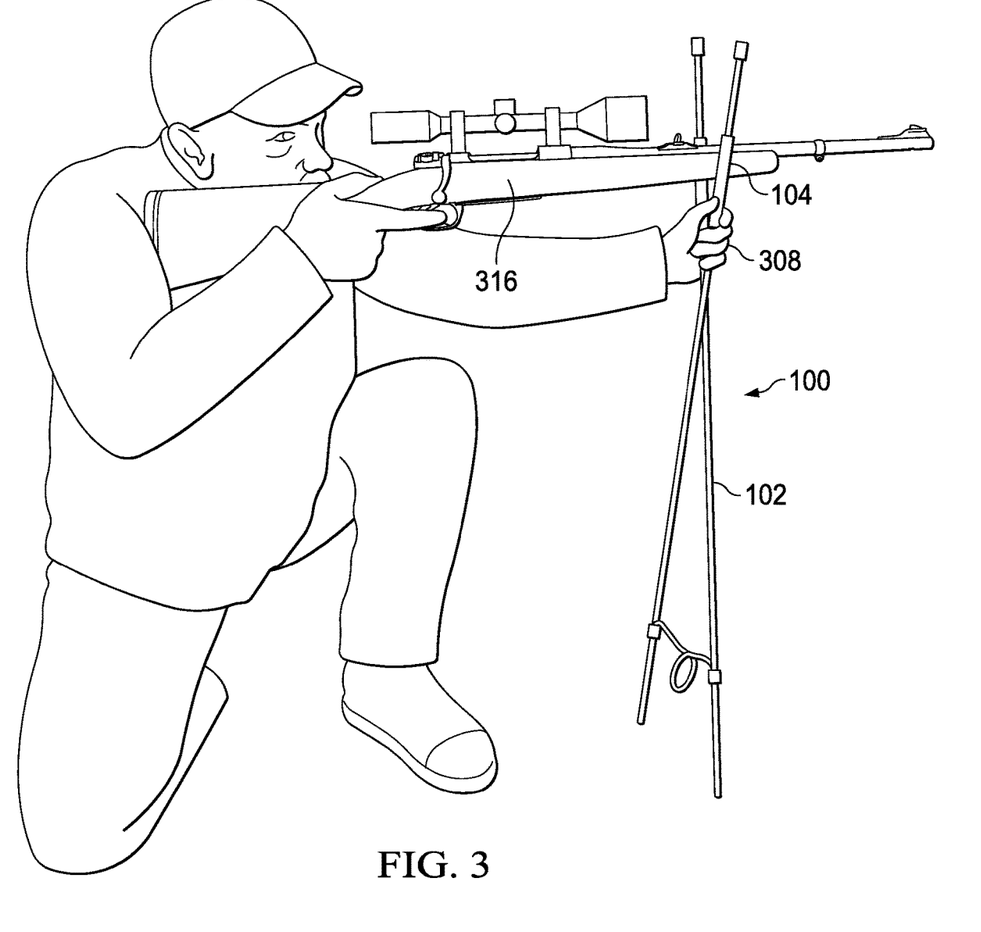
FIG. 3 illustrates a side perspective view of the embodiment of the shooting sticks device depicted in FIG. 1, showing a profile of a user resting a firearm on the support rests.

When in a deployed mode as shown in FIG. 1, the outer surface of the support rests (104) of the shooting sticks (100) provide a resting platform for a firearm. A firearm may be placed on the support rests (as shown at FIG. 3) just above the pivot point (where the shooting stick legs intersect and are joined together by a pin). The weight of a firearm/optic will, depending on the elasticity of the elongate elastic members, cause the support rests and lower cap assemblies to travel down a distance along the legs of the shooting sticks until a point at which the upwardly-directed resistive force (spring force directed towards upper cap assembly) equals the downward force attributable to the weight of the firearm/optic plus any downward force applied by a user. The upwardly directed force provided by the elastic members provide an advantage over prior art shooting sticks designs in that it relieves the user from having to support the weight of the firearm when aiming/firing, while allowing the user to apply upward and downward movement with only minimal force. The elastic member also serves to lessen the effects of movements of the firearm when aimed by a user that might otherwise contribute to decreases in the accuracy of shot placement. This provides a benefit to the user and an advantage over prior art shooting sticks in that the shooting sticks device described herein provides enhanced support and movement stability, thus facilitating more accurate aiming and firing. The ability of the support rests to slide along the legs, and the nature of the pivoting attachment of the legs, allows users to easily shift a supported firearm to the left and right to aim, and also facilitates more stable up and down movements when aiming.

The embodiments of the shooting sticks devices described herein include an elastic member attached to each support rest. However, it is contemplated that alternate embodiments of the shooting sticks may be configured such that an elastic member is attached to only one of the two support rests. In such alternate embodiments utilizing only one elastic member, the elastic member may be constructed of materials providing it with a greater resistive force (higher spring constant) than would otherwise be needed were an elastic member attached to each support rest.

Still referring to FIG. 1, the legs (102) of the shooting sticks are comprised of a plurality of leg segments which, in one embodiment, are hollow and have an elastic and flexible cord running through the length of the legs, the cords being secured at the ends of the legs. As discussed in reference to FIG. 1, the leg segments in one embodiment are interlocking (one end of a leg segment having a reduced diameter is capable of being removably mated to the end of an adjacent leg segment having an increased diameter), the cord keeping the leg segments together in much the same manner as tent poles often used in backpacking. In one embodiment, a limiting cord (112) secured to bottom portions of the legs at cord keepers (114) attached to the legs, restricts the movement of the legs to prevent the bottom portions from becoming to greatly separated. The limiting cord may also, in some embodiments using a threaded fastener to connect the two legs at the pivot point, prevent the pivot point from becoming disengaged. An elastic retaining band (116) may be used to secure the leg segments when in a non-deployed mode, the retaining band being used to wrap around the leg segments and support rests into a bundle for transport or storage.

Referring now to FIG. 2, a perspective view of one embodiment of a collapsible leg (102) of the shooting sticks device comprising a plurality of interlocking leg segments joined by an elastic and flexible cord is illustrated. As noted above, the interlocking nature of the leg segments, with one end of the leg segment having a reduced diameter portion configured to mate with an increased diameter portion of an adjacent leg segment, allows the legs of the shooting sticks to be taken apart and folded up by a user (208). Thus, the shooting sticks may be folded into a compact form when in a non-deployed mode. The legs of the shooting sticks may in various embodiments be constructed of various types of materials that are preferably having rigid but relatively light weight properties. For example, the legs of the shooting sticks may be constructed of materials such as, for example, aluminum, fiberglass, titanium, and various polymers (for example, carbon fiber).

In alternate embodiments, the legs of the shooting sticks device may comprise a plurality of telescoping leg segments. In such an alternate embodiment, the leg segments may have various diameters, decreasing in diameter from an upper end of the legs to the lower end of the legs, on which rubber feet may be secured. In such alternate embodiments, the variation in diameters of the leg segments will allow the legs to interconnect with one another via threaded securing fasteners at the leg segment joints to provide a telescopic effect such that the largest diameter leg segment may receive into a hollow inner portion of the leg segment, the other leg segments. The threaded securing fasteners at the leg segment joints may be twisted to tighten or alternatively loosen the joints between the adjoining leg segments.

In further alternate embodiments of the shooting sticks devices, the legs may be formed as a single body without the ability to be "taken down" or collapsed into smaller leg segments. Such an alternate embodiment may be utilized to provide for efficiency of construction, to reduce manufacturing costs, and to provide for greater structural rigidity.

Referring now to FIG. 3, a side perspective view of the embodiment of the shooting sticks (100) depicted in FIG. 1, showing a profile of a user (308) resting a firearm (316) on the support rests (104) is illustrated. In one embodiment, a user (308) may grasp the support rests (104) and/or lower cap assembly and apply a downward force as a firearm (316) rests on the support rests (104). As discussed above, the elastic members will provide an upwardly directed force that is countered by the weight of the firearm and any downward force applied by the user. The shooting sticks device may be inclined forward or backward, left or right, and the elevation of the firearm raised or lowered, depending on the aiming requirements of the user. The ability of the support rests to slide along the legs, and for the sticks to pivot about the pivot point pin, provides for such freedom of movement by the user. Indeed, such movement of the support rests provides for greater freedom of the user to aim/fire at a downward angle, which might be required in mountain hunting.

Figure 4:
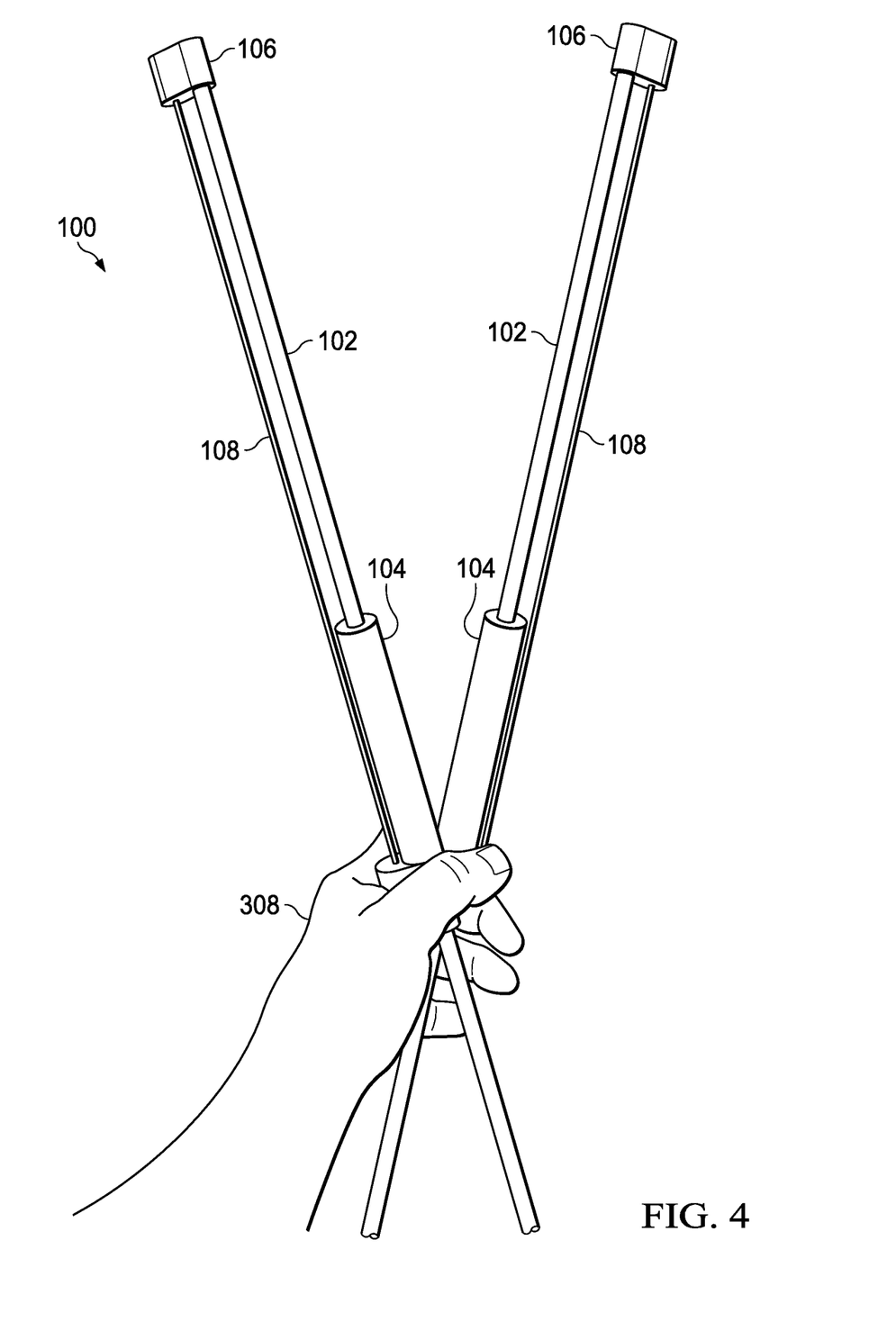
FIG. 4 illustrates a front perspective view of an upper portion of the embodiment of the shooting sticks device depicted in FIG. 1, showing a hand of a user applying a downward force on the support rests.

Referring now to FIG. 4, a front perspective view of an upper portion of the embodiment of the shooting sticks device (100) as depicted in FIG. 1, showing a hand of a user (308) applying a downward force on the support rests (104) and lower cap assembly. As the support rests are pulled downward, the elastic members (108) stretch and impart an upwardly directed force on the lower cap assembly and support rests. Upper ends of the elastic members and legs are secured to the upper cap assemblies (106).

Figure 5:
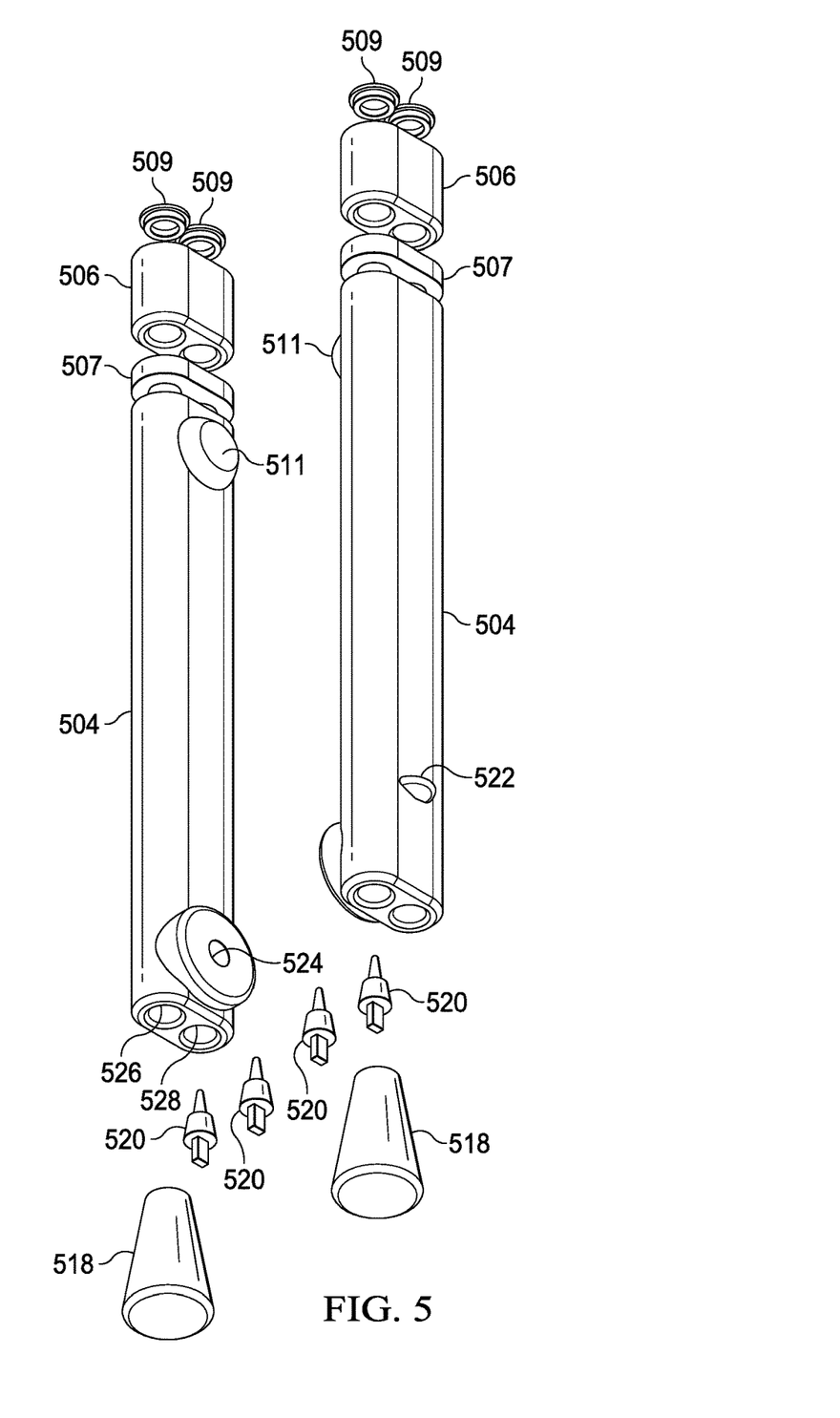
FIG. 5 illustrates an exploded view of an alternate embodiment of the support rests, along with various components for securing elastic members and legs of an alternate embodiment of the shooting sticks device.

Referring now to FIG. 5, an exploded view of an alternate embodiment of the support rests of the shooting sticks device, along with miscellaneous components utilized to secure the elastic members and legs is shown. In this alternate embodiment, the support rests (504) are each comprised of a housing having two substantially parallel enclosed channels (not shown) running the length of the support rest as depicted in FIGS. 6, 7, 8, and 10. A first enclosed channel is sized to allow for the passage of a leg of the shooting stick, and a second enclosed channel is sized to allow for the passage of the elastic member. By running the elastic members through the support rest housing, rather than being exposed as is depicted in FIG. 1, it is less likely that the elastic members will be inadvertently touched or snagged by the user or his/her firearm during use.

In this embodiment shown in FIG. 5, a foam cushion pad (507) having two holes is configured to be secured to the top end of the support rest, between the support rest and the upper cap assembly, such that upon upward return of the support rest to its uppermost position of travel along the legs, any impact with the upper cap assembly (506) is softened and noise reduced. Noise reduction provided by the cushion pad (507) provides a benefit when a user is hunting and any noise is unwanted as it could potentially frighten or otherwise alert wildlife. Caps (509) insertable into the holes on the upper cap assembly are used to secure the elastic members and legs to the upper cap assembly. Stoppers (520) provide a structural means by which to secure elastic members comprising hollow elastic tubing into the support rests and/or a lower cap assembly. Rubber feet (518) mountable on the lower ends of the legs provide for additional traction, reducing the likelihood that the shooting sticks will slip on the ground or other shooting surface upon which the shooting sticks rest. In one embodiment, raised protrusions are formed on the inner surfaces of the support rests, and configured to come into contact with one another when the shooting sticks are configured in an undeployed mode. These protrusions, when in contact with one another, provide the shooting sticks with increased structural rigidity when not in use.

Figure 6:
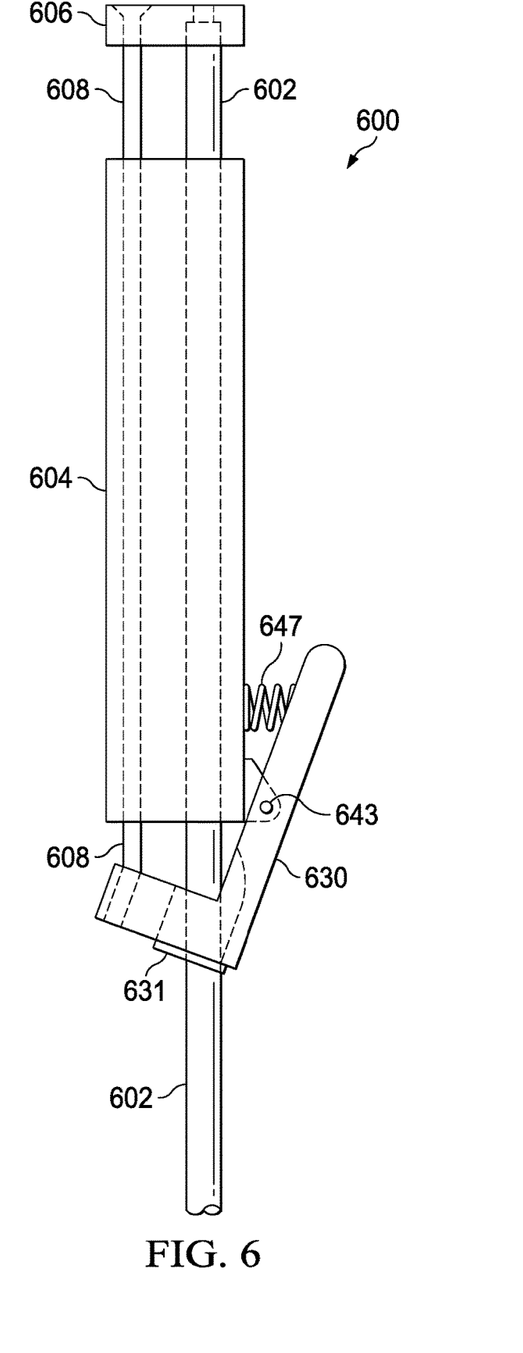
FIG. 6 illustrates a side view of an upper portion of the shooting sticks device having alternate embodiments of a support rest and brake handle.

Referring now to FIG. 6, a side view of an upper portion of the shooting sticks device having alternate embodiments of a support rest and handle is shown. A brake handle (630) is pivotally connected, via a pin (643), to a flange formed on the side of the support rest (604). In this embodiment, the brake handle pivot pin (643) is displaced from the axis of the leg (602) by the flange, which extends laterally from the outer surface of the support rest. A spring (647) is naturally biased to push (rotate) the upper portion of the brake handle away from the support rest, causing the elastic member (608) (secured to lower portion of the brake handle) to be deformed, and the hollow lower portion of the brake handle through which the leg passes, to be wedged against the leg at points of contact. In one embodiment, the inside surface of the aperture of the brake handle has a silicone rubber lining (631) such that when the brake handle (630) is wedged against the leg (602), sliding of the brake handle along the leg is arrested completely, or travel is substantially impeded without the application of excessive downward force.

Figure 7:
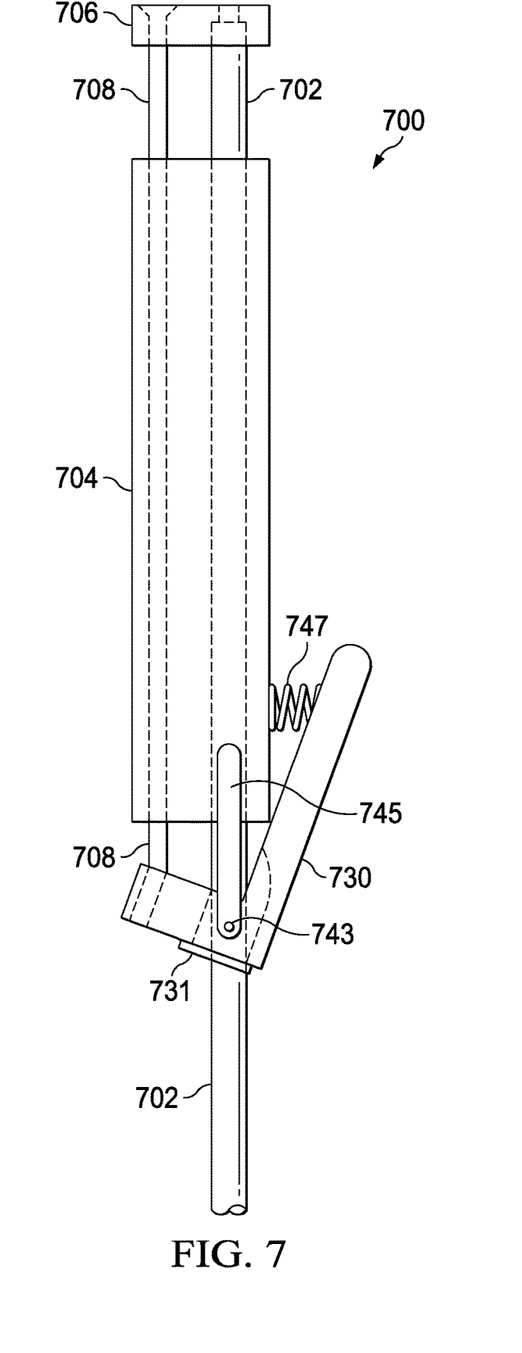
FIG. 7 illustrates a side view of an upper portion of the shooting sticks device having further alternate embodiments of a support rest and brake handle.
Figure 8:
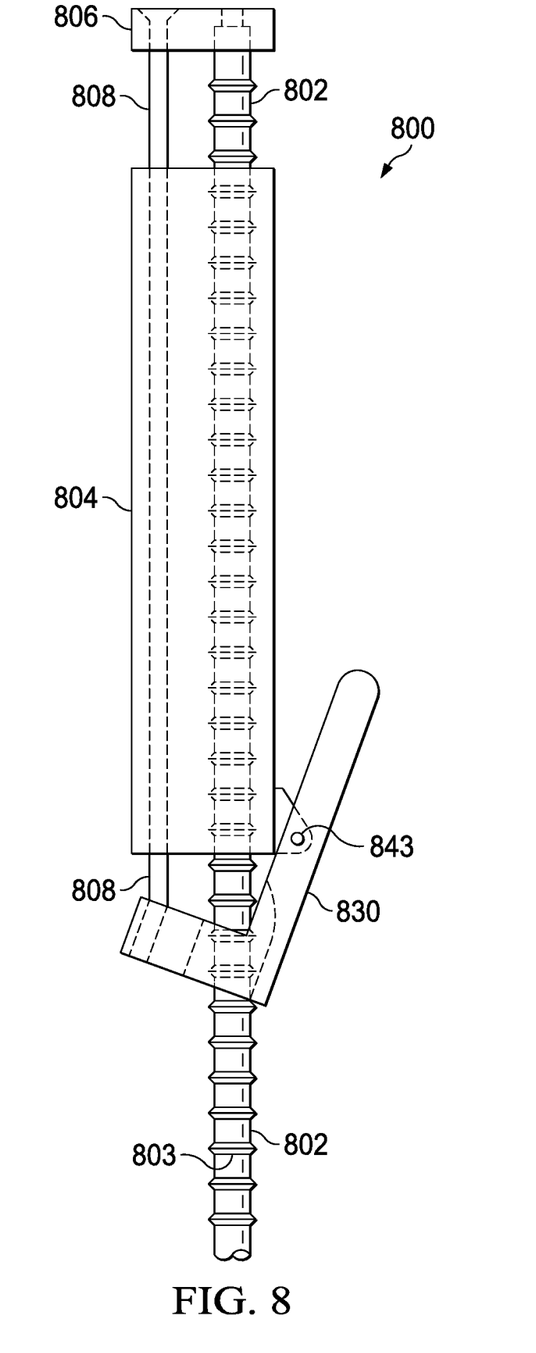
FIG. 8 illustrates a side view of an upper portion of the shooting sticks device having further alternate embodiments of a support rest, brake handle, and legs.
Figure 9:
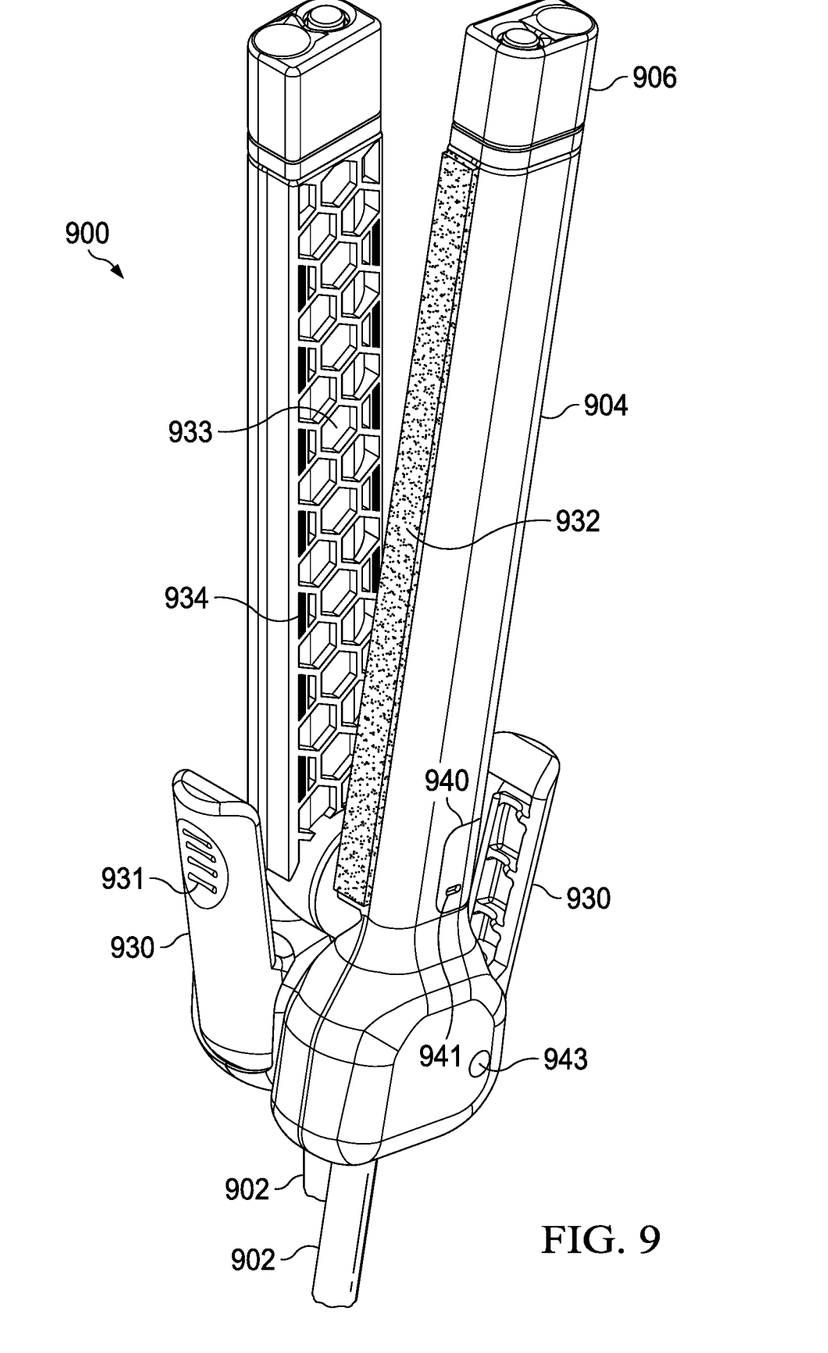
FIG. 9 illustrates an upper perspective view of an upper portion of the shooting sticks device having further alternate embodiments of a support rest and brake handle.

In such alternate embodiments of the shooting sticks device having support rests that include brake handles attached to each support rest, a spring-loaded brake handle is fastened to a lower portion of each support rest, with each of the two legs of the shooting sticks having a single support rest attached to an upper portion thereof. To be clear, while FIGS. 6, 7, and 8 depict a single modified support rest having a leg and elastic member passing through enclosed channels within the support rest, it is contemplated that each such support rest is pivotally attached to an identical support rest (with elastic member and leg) via a pin or rivet as is depicted in FIG. 9, the two pivotally connected support rests having outer surfaces for resting and stabilizing a firearm. In other words, while the entire shooting sticks device is not illustrated in FIGS. 6-10, the entirety of the legs not being depicted, the reader should understand that the upper portions of the shooting sticks device depicted in such drawings are intended to include the entire device with elongate legs as depicted in FIG. 1.

Still referring to FIG. 6, the brake handle (630) is secured to a lower end of an elastic member and includes an aperture through which a leg (602) passes. The brake handle is attached to the support rest at, in one embodiment (also shown at FIGS. 7, 8, and 9), a single pivot point or fulcrum, allowing for the swiveling of the brake handle with respect to the support rest to which it is attached. It is contemplated that in some embodiments of the shooting sticks device, the brake handle is configured to be a separate component from the support rest to which it is attached (see FIGS. 6-8), but in other embodiments the brake handle will be more integrally attached to the support rest (see FIGS. 9-10).

A spring (647) secured to both the brake handle and the support rest, pushes the upper portion of the brake handle away from the support rest, while causing the lower portion of the brake handle which is connected to a lower end of the elastic member (608), to deform such lower end of the elastic member (608), while additionally causing the brake handle aperture having an inner surface lined with silicone tubing (631) to wedge against the leg (brake aperture not oriented perpendicular to leg), thereby aiding the halt of any travel of the leg through the brake handle aperture. In this manner, the brake handle works to stop downward sliding movement of the support rest with respect to the legs. The brake handle also works to impede movement of the support rests in the upward direction as well. Thus, a user must apply force to the upper portion of the brake handle, in the direction of the support rest, to release the braking force and allow for the downward movement of the support rests. When the brake handle is compressed towards the support rest, the lower portion of the brake handle is no longer wedged against the leg (brake aperture is substantially perpendicular to the leg), and the elastic member is no longer deformed, allowing the brake handle/support rest to slide along the leg. One advantage of utilizing such a brake handle is that it allows the support rests to be utilized as a more stable platform for aiming and shooting. Other aspects of the alternate embodiment of the shooting sticks as shown in FIGS. 6, 7, 8, and 9 are identical to the aspects of the embodiments with respect to the legs of the shooting sticks described above in connection with the embodiments of FIGS. 1-4, and will thus not be discussed.

Referring now to FIG. 7, a side view of an upper portion of the shooting sticks (700) device having further alternate embodiments of a support rest (704) and brake handle (730) is shown. In this alternate embodiment, the brake handle (730) is attached to flange substantially parallel to the legs, the flange attached on one upper end to a lower portion of the support rest (704), and the flange attached on a lower end to the outer surface of opposite sides of the brake handle via rivets (743) adjacent to the brake handle aperture through which the leg passes. This alternate mounting configuration of the brake handle to the support rest results in increased braking force being applied to the leg as two points of contact with the leg are made by the brake handle aperture. The silicone rubber lining (731) on the inside of the first aperture of the lower portion of the brake handle assists with halting any sliding movement of the brake handle/support rest and the leg (702), especially when used in conjunction with a leg constructed of a polymer. In order to release the brake handle aperture's grip on the leg, a force must be applied to the top portion of the brake handle, in a direction towards the support rest, thereby causing the aperture of the brake handle to become un-wedged from the leg (allowing for free movement of the brake handle/support rest with respect to the leg).

Referring now to FIG. 8, a side view of an upper portion of the shooting sticks (800) device having further alternate embodiments of a support rest (804), brake handle (830), and legs (802) is illustrated. In this embodiment, notches (803) are formed on the exterior surfaces of at least a portion of the length of the legs of the shooting sticks. Again, although only one leg, support rest, and other components are shown in FIG. 8 for illustrative purposes and for ease of explanation, it is contemplated that an identical corresponding leg with identical components would be pivotally attached (attachment structures have been omitted to better illustrate the braking mechanisms of these embodiments) as shown in FIG. 9 and in other embodiments of the shooting sticks discussed herein. Various types of notches may be formed on the exterior surface of the legs, said notches providing an alternate means of applying a braking force to halt travel of the braking handle/support rest along the legs of the shooting sticks. In other alternate embodiments, an aperture of the brake handle may have notches or ridges formed on the inner walls of such aperture, such notches or ridges being formed to correspond to the notches (803) formed on the exterior surfaces of all or a portion of the legs (802). Thus, when a spring (not shown) secured to the brake handle and support rest, causes the lower portion of the brake handle to wedge against the leg, the notches/ridges formed on the inner walls of the aperture of the brake handle mate with the notches (803) formed on the leg. Therefore, the mating of the corresponding notches and ridges provides for increase braking force to halt sliding of the brake handle and support rest with respect to the legs of the shooting sticks.

Figure 10:
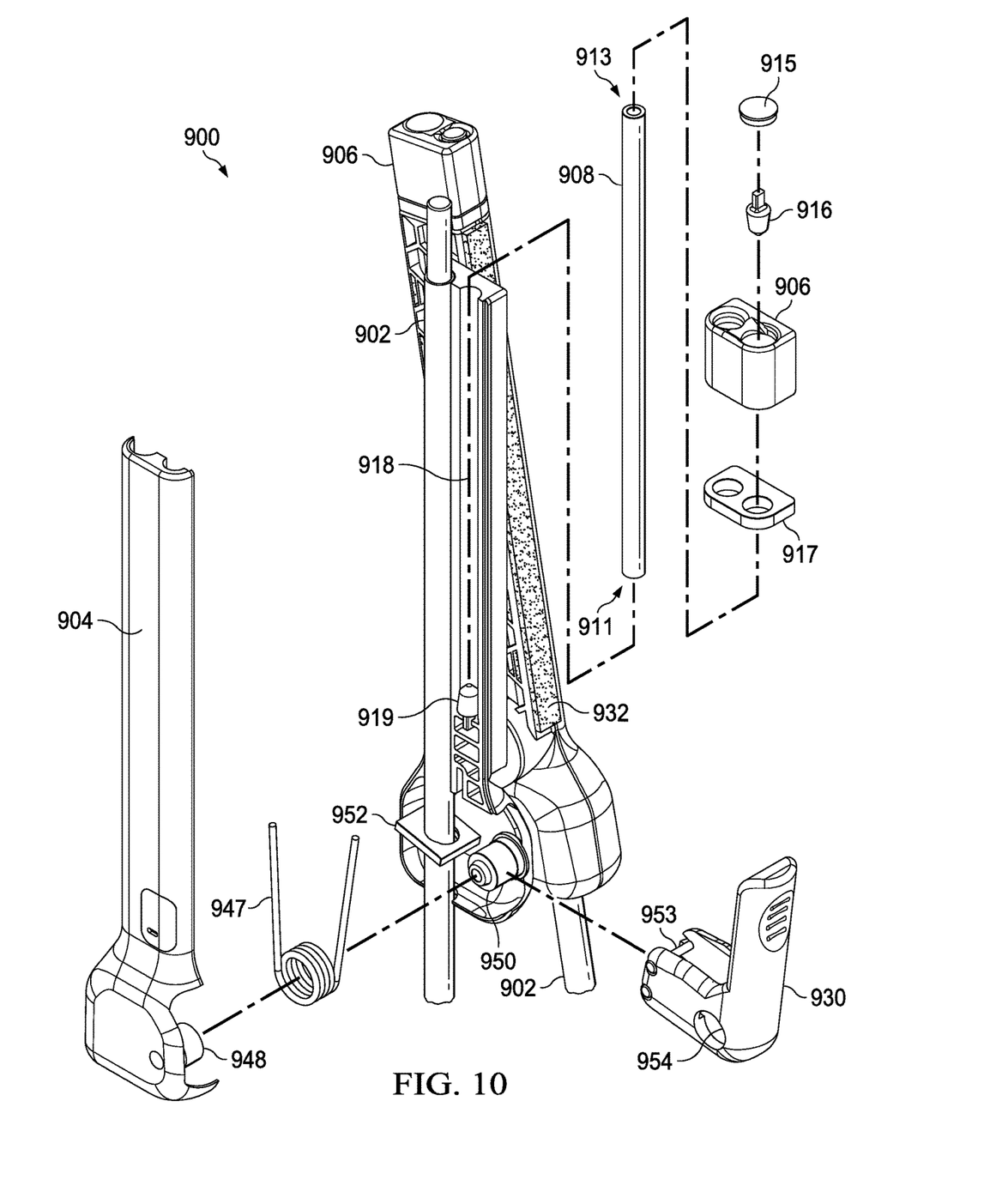
FIG. 10 illustrates an exploded upper perspective view of the alternate embodiment of the shooting sticks device depicted in FIG. 9.

Referring now to FIG. 9, a perspective view of an upper portion of an alternate embodiment of the shooting sticks device having further alternate embodiments of a support rest (904) and brake handle (930) is shown. In one embodiment, each support rest (904) is elongate and has a length that is substantially parallel to legs (902) of the type described in connection with the embodiments depicted in FIGS. 1-3. In one embodiment, each of the two support rests (904) of the shooting sticks device includes a first enclosed channel (shown in FIG. 10) running through the length of the support rest, said channel being sized to allow for the passage of a leg of the shooting sticks. As depicted in FIGS. 9 and 10, a leg protrudes through an opening on the lower end of the support rest adjacent to the brake handle (930), and a reduced diameter top end of the leg is essentially flush with top of the upper cap assembly (906). In one embodiment, the top of the legs may be fastened or otherwise affixed to the upper cap assembly (906). The brake handle (930) and in particular, the brake aperture (952) as depicted in FIG. 10, works to arrest the movement of the support rest up and down each leg when the brake handle is not depressed. Each brake handle is fastened to a lower end of the support rest, the brake handle being configured to rotate about a pin (943) or other fastener allowing for rotational movement of the brake handle with respect to the support rest.

In one embodiment, a circularly shaped protrusion is formed on the lower portion of each of the two support rests (904) adjacent to a pivot point. In one embodiment, a pin or rivet (not shown) is used as an attachment point to pivotally couple the opposing support rests (904) of the shooting sticks to one another. In other alternate embodiments, a threaded rod may be utilized to fasten one support rest to another support rest having a correspondingly threaded receptacle.

Still referring to FIG. 9, one or more outer surfaces of the support rest may include cushioned and/or textured surfaces configured for the resting of a firearm or other object that the user of the shooting sticks desires to be stabilized. In one embodiment, an adhesively affixed overmolded rubber layer (932) is attached to an outer surface of a portion of the support rest, allowing the support rest to better grip a firearm and reduce unwanted slippage. Such cushioned layer (932) also works to reduce unwanted noise that might otherwise be generated by the hard surface of a firearm contacting an otherwise hard surface of the support rest. While not depicted in FIG. 9, it is contemplated that an outer surface of the opposing support rest also includes a soft layer adhesively affixed thereto such that when in use, a "V" shaped firearm rest is formed between the two support rests. In one embodiment, other textured and cushioned surfaces may be utilized with respect to the support rests. For example, a portion of the surfaces of the support rests may have textured surfaces formed thereon. Hexagonally (933) and trapezoidally shaped indentations are formed on at least one side of the support rests, providing surfaces that make it easier for a user to grip the support rests with bare hands or gloves. In one embodiment, rubber inserts (934) may fill all or a portion of the indentations, thus providing better gripping texture and additional cushioning properties. The outer surface of the brake handle (930) may also include textured surface features (931) such as grooves, indentations, or raised members, facilitating a user's ability to grip and effectively engage the brake handle. In one embodiment, a removable access panel (940) provides a user with the ability to gain access to inner portions of the support rest as discussed below in further detail in connection with exploded view depicted in FIG. 10. A small opening (941) in the access panel allows the panel to be removed with any tool having a point sized to fit through such opening and pull out the access panel.

Referring now to FIG. 10, an exploded perspective view of the alternate embodiment of the shooting sticks device depicted in FIG. 9 is shown. Each elongate support rest (904) includes a brake handle pivotally attached to a lower portion of said support rest. In one embodiment, a substantially cylindrical pin (950) attached to the lower end of the support rest is configured to pass through a hole (954) formed in the brake handle and be fastened to a receptacle (948) that is in turn fastened to an opposing side of the support rest. The brake handle is configured to rotate or pivot about the pin, which in turn changes the angle of a brake handle aperture (952) through which a leg (902) of the shooting sticks passes. It should be noted that although the brake handle aperture (952) and brake handle (930) do not appear to be connected in FIG. 10, they are in fact intended to be connected as is depicted in FIG. 11, while in other alternate embodiments the brake aperture is not a separate component, but instead formed as part of the brake handle.

When the angle of the brake handle aperture (952) is oriented substantially perpendicular to the leg which passes through such aperture, the leg may slide up and down through such aperture. However, when the brake handle aperture (952) and leg (902) that passes through such aperture are not oriented perpendicular to one another the inner wall of the brake handle aperture will grip the outer surface of the leg, thereby arresting any sliding movement of the leg through the brake handle aperture. A spring (947) or other biasing device has first shaft that is connected to and imparts a force on an inner surface of the substantially vertical first shaft of the brake handle (see FIG. 11), and a second shaft of the spring in contact with an imparting a force on an inner surface of the support rest, the spring being naturally biased to rotate the brake handle away from the support rest as has been described in connection with the embodiments of the brake handle depicted in FIGS. 6 and 7. The brake handle includes a brake aperture that is integrally formed within the portion of the handle configured to be positioned adjacent the leg or, as depicted in FIGS. 10 and 11, has a brake handle aperture (952) that is configured to be a separate component that is affixed to the brake handle. When the brake handle is not compressed by a user, the spring (947) causes the brake handle to be naturally biased away from the support rest and leg, which in turn causes the brake handle aperture to not be oriented perpendicular to the leg which passes through said aperture. Thus, the brake handle aperture wedges against the leg, arresting any sliding movement of the leg. When the brake handle is depressed with such force as to overcome the naturally outward force of the spring, the brake aperture is rotated to become oriented perpendicular to the shaft of the leg of the shooting sticks, allowing the support rest to freely slide up and down the leg. In this manner, the default mode of the shooting sticks is that support rests are essentially locked into position at a particular location along the legs until a user depresses the brake handles to allow the support rests to slide up and down the legs to which they are respectively attached.

Still referring to FIG. 10, a second enclosed channel (918) is formed within each support rest, running along an inside length of the support rest parallel to the first enclosed support channel, the second enclosed channel being sized to allow for the passage of an elastic member (908) such as a hollow elastic cord or tubing. Adjacent to a lower end of the second enclosed channel (918) is a lower plug that is connected or wedged into place in the support rest. A top end of the lower plug (919) is configured to be inserted and retain a lower end (911) of the elastic member (908), said top end of the lower plug being insertable into an opening formed on the lower end (911) of the elastic member. The access panel (940) depicted in FIG. 9 may be removed to gain access to the lower plug (919) and elastic member, which facilitates repair of the shooting sticks and/or replacement of the elastic member. An upper end (913) of the elastic member (908) is secured to an upper cap assembly (906) via an upper plug (916) configured to be inserted into said upper end (913) of the elastic member (908). The upper plug (916) may be fastened to or wedged within the upper cap assembly having holes formed within to allow for the passage of the elastic member and leg. In one embodiment, a top end of each of the legs (902) may include a reduced diameter portion the is fastened or affixed (for example, with epoxy) to the upper cap assembly (906) to secure the legs to the respective upper cap assembly to which it is attached. A cushioned pad (917) may be utilized to provide for increased noise suppression that might otherwise be generated by contact between the upper cap assembly and the support rest when the support rest returns to its upward most position of travel along the leg.

Figure 11:
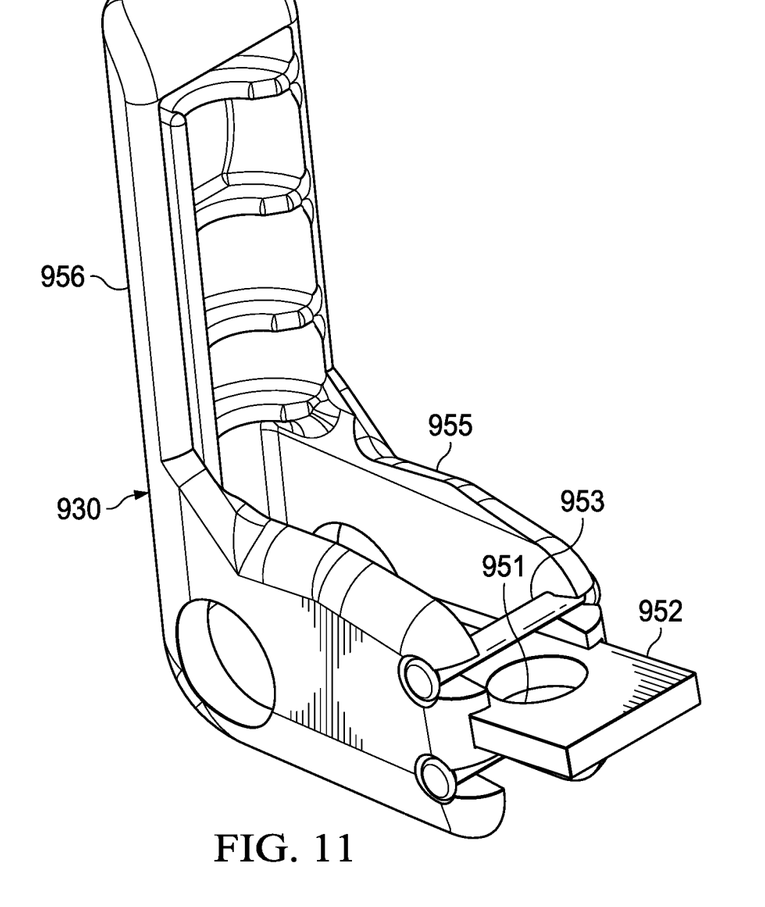
FIG. 11 illustrates a perspective view of the embodiment of the brake handle depicted in FIG. 10.

Referring now to FIG. 11, a perspective view of the embodiment of the brake handle (930) depicted in FIG. 10 is shown. The brake handle comprises a substantially vertical first shaft (956) substantially parallel to the support rest and leg to which it is attached, and having an outer surface on which a user may depress to rotate the handle towards the support rest and leg. An inner surface of the of substantially vertical first shaft is formed to receive a shaft of the spring such that the force generated by the spring is imparted to the brake handle. The brake handle further comprises a substantially horizontal second shaft (955), substantially perpendicular to the adjacent leg, and having a brake handle aperture formed integrally with the brake handle or, as depicted in FIG. 11, comprising a separate brake handle aperture (952) component configured to be attached to the brake handle via a channel formed within the brake handle and configured to receive the brake handle aperture component. An opening (951) in the brake handle aperture (952) is sized to accommodate the passage of a leg of the shooting sticks. In one embodiment, one or more retaining pins (953) may be attached to the end of the substantially horizontal second shaft (955) and configured to prevent the brake handle from splaying apart.

The inventions may be embodied in other specific forms without departing from the spirit or essential characteristics thereof. The present embodiments are therefore to be considered in all respects as illustrative and not restrictive. Accordingly, the scope of the inventions is established by the appended claims rather than by the foregoing description. All changes that come within the meaning and range of equivalency of the claims are embraced therein.

We claim:

1. A shooting sticks device comprising:
   a plurality of legs, each of said plurality of legs being formed by the connection of a plurality of leg segments;
   a plurality of elongate support rests pivotally attached to one another, a shaft of each of one of said plurality of legs passing through a first enclosed channel formed inside of one of each of said plurality of elongate support rests, said elongate support rests being capable of sliding along the respective leg which passes through said first enclosed channel;
   a plurality of upper cap assemblies, one of each plurality of upper cap assemblies being attached adjacent to a top end of one of each of said plurality of legs; and
   a plurality of elongate elastic members, each elongate elastic member having a first end attached to one of said upper cap assemblies and a second end attached to one of said elongate support rests.

2. The shooting sticks device of claim 1, wherein a second enclosed channel is formed inside each of said plurality of elongate support rests, said second enclosed channel running along the at least a portion of the length of each of said plurality of elongate support rests.

3. The shooting sticks device of claim 2, wherein one of said plurality of elongate elastic members passes through one of said second enclosed channel.

4. The shooting sticks device of claim 2, further comprising a brake handle that is pivotally attached to one of each of said plurality of elongate support rests, said brake handle having a first shaft substantially parallel to the respective collapsible leg which passes through said respective elongate support rest to which the brake handle is attached, and said brake handle having a second shaft substantially perpendicular to the respective leg which passes through said respective elongate support rest to which the brake handle is attached.

5. The shooting sticks device of claim 4, wherein a spring has a first end attached to said brake handle, and said spring has a second end attached to said elongate support rest, said spring being naturally biased to rotate said first shaft of said brake handle away from the respective elongate support rest to which it is attached.

6. The shooting sticks device of claim 4, wherein said second shaft of said brake handle includes an aperture through which one of said plurality of legs passes through.

7. The shooting sticks device of claim 6, wherein said aperture, when not oriented perpendicular with respect to the leg which passes through said aperture, is configured to arrest any sliding movement of said leg through said aperture.

8. The shooting sticks device of claim 7, wherein said aperture, when oriented perpendicular with respect to the leg which passes through said aperture, is configured to allow for the sliding movement of said leg through said aperture.

9. The shooting sticks device of claim 8, wherein said aperture is configured to be oriented perpendicular with respect to the leg which passes through said aperture when a user causes said first brake shaft to rotate in a direction towards said elongate support rest to which said brake handle is attached.

10. The shooting sticks device of claim 1, wherein a cushioned strip is attached to at least a portion of an outer surface of each of said plurality of elongate support rests.

11. The shooting sticks device of claim 1, wherein at least a portion of an outer surface of each of said plurality of elongate support rests has indentations formed thereon.

12. The shooting sticks device of claim 4, wherein an outer surface of said first shaft of said brake handle has a plurality of raised members formed thereon.

13. The shooting sticks device of claim 1, wherein each of said plurality of legs is collapsible.

14. The shooting sticks device of claim 13, wherein each of said leg segments constituting a single one of said plurality of legs is connected to at least one other adjacent leg segment via a flexible cord.

* * * * *